(No Model.)

N. J. GLOVER.
CAR COUPLING.

No. 256,996. Patented Apr. 25, 1882.

Witnesses.
Henry E. Rhoads
Robert J. Glover

Inventor.
Newton J. Glover

UNITED STATES PATENT OFFICE.

NEWTON J. GLOVER, OF WAVELAND, INDIANA.

CAR-COUPLING.

SPECIFICATION forming part of Letters Patent No. 256,996, dated April 25, 1882.

Application filed January 17, 1882. (No model.)

*To all whom it may concern:*

Be it known that I, NEWTON J. GLOVER, residing at Waveland, in the county of Montgomery and State of Indiana, have invented an Improvement in Car-Couplings, of which the following is a specification, reference being had to the accompanying drawings, forming a part thereof.

My invention relates to an improved freight-car coupling, whereby a person can conveniently both couple and uncouple the cars, either from the top or on the ground, without going between for that purpose.

Figure 1:
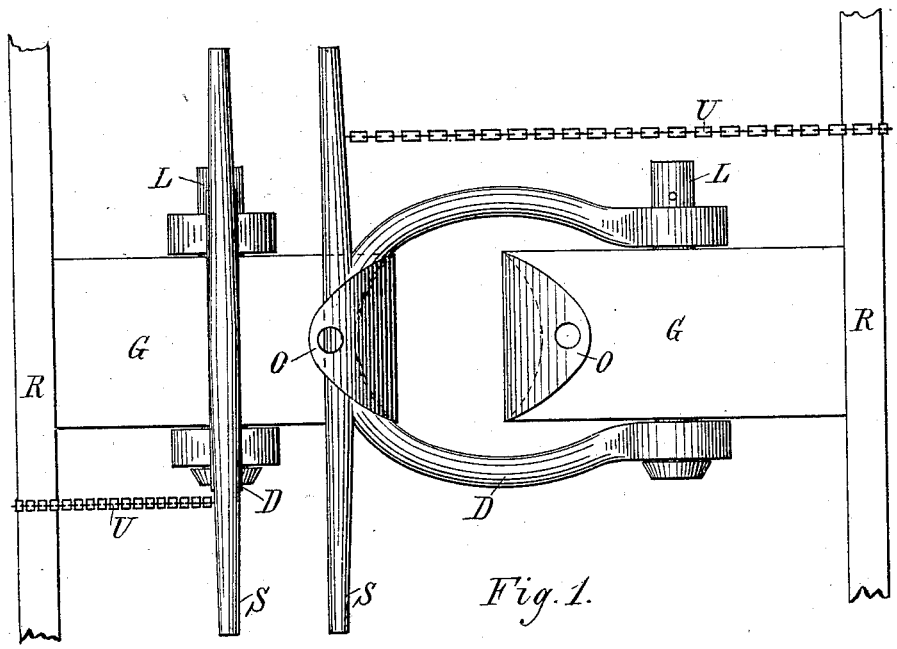
Figure 2:
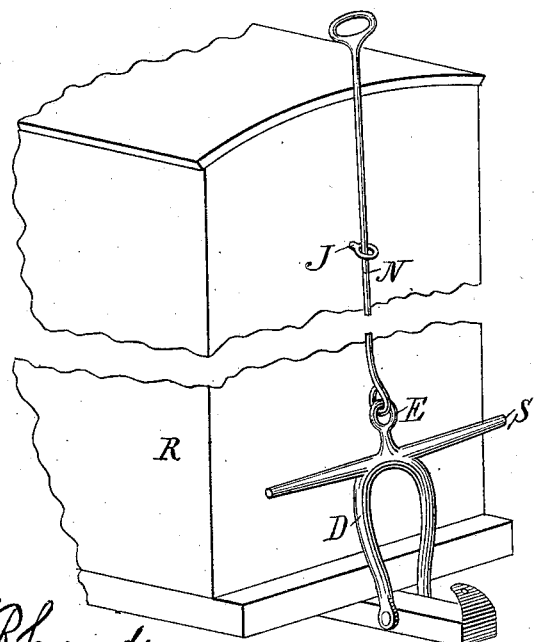

Figure 1 is a square top view, and shows the coupling as constructed for flat cars. Fig. 2 is an elevated side and end view, and shows the coupling as constructed for box-cars.

With but one addition, I use the same kind of draw-bars with the link-and-pin coupling as now in common use for freight-cars, though I dispense with the link and pin. I use the draw-bars with the recess for the link and the hole for the pin, that cars with that kind of coupling can be coupled with those that have my improved coupling.

Draw-bars G G, as shown in Fig. 1, each have a hook, O O, on the top forward end, which turn back toward the car to which the draw-bar is attached. Those hooks may be made solid with the draw-bars, as shown in the drawings, or they may be made separate and attached to the draw-bars by bolts or otherwise, and if the hooks are attached the bed-plate of the same may extend back on top of the bars far enough that the hole for the bolt may be through the same instead of the draw-bars, as hereinafter shown. The hooks should be made of sufficient width on top to admit the hole necessary for the pin in case of a link-and-pin coupling becoming necessary. The said draw-bars G G each have a hole horizontally through at about two-thirds the distance from their ends to where they reach the car. Those holes are to admit the bolts L L, which pass through and secure the clevises D D, the bolts each also forming a journal for each, on which they work loosely, and are moved up or down to couple or uncouple the cars by means of the lifting-rods S S, one of which is attached to the extreme outside circle of each clevis, the rods reaching sufficiently each way from the clevises that a person, with their use, can both couple and uncouple the cars without going between them for that purpose.

The chains U U, connecting from the lifting-rods to the end of the cars R R, are for the purpose of uncoupling by a person in the cars. Both the coupling and uncoupling are effected by bringing the ends of the draw-bars together, in which position either of the clevises may be turned up or down, the extension of which being sufficient to pass beyond the hook of the car to be coupled on; and when the car is drawn forward the clevis is drawn under the hook, as shown in Fig. 1. The under side of the hooks and the top of the draw-bars under the hooks should be rounded or ovaled, and the inside of the hooks that the clevis pulls against should be of about the same circle of the clevis. The clevises may be the shape shown in the drawings, or they may be made more link or U shaped from where they extend beyond the draw-bars to which they are attached. Either is practicable. As shown in Fig. 1, one clevis in the hook of the opposite car forms the coupling complete, and the other clevis and hook are not engaged. It will be observed that on account of the changing of the ends of cars each draw-bar must be provided with the hook and clevis. The clevis not in use for coupling should be turned down to rest on the lifting-rod of the one in the coupling, as it will thereby prevent it from jostling or bouncing out of the hook by the motion of the cars.

As shown in Fig. 2, the coupling for box-cars is the same as already described for flat cars, except the chains U U are not used, and there is added the extension E from the extreme out circle of the clevis D. The extension connects by a bolt with lever N, the bolt forming a journal. The lever extends up through the eye of arm J, projecting at right angles from the end of the car R, to which it is attached. The said lever extends a sufficient distance above the top of the car to be conveniently used by a person on the car to either couple or uncouple the same, which is effected by the use of the said lever, the arm N forming a stay or fulcrum, by which, from the top of the car, the clevis can be both turned in and out of the coupling. The clevis, as shown in Fig. 2, is resting against the end of the car, and the lever, from its attachment at the clevis, leans forward at the top. On the clevis being turned down in the coupling the lever is made to lean the other way, and serves, by the stay of the eye through which it passes, to prevent the bouncing up of the clevis without the aid of the opposite clevis, as in case of flat cars.

For box-cars I anticipate attaching the lifting-rod to the lever, instead of the clevis, as shown.

As shown in both Figs. 1 and 2, the bolts L L, forming the journals of the clevises, are at such a distance from where the draw-bars leave the cars that the clevises, when not in use, balance back and rest against the car, in which position the cars may be pushed together without the couplings uniting or being damaged thereby.

I anticipate that, were the clevises and their attachments to work them dispensed with and the coupling made by a loose link in the hooks O O described, the link, having short rods attached for handling, would be fully as substantial and far more convenient and safe for the one using them than the now common link-and-pin coupling.

Having fully described my invention, what I claim, and desire to secure by Letters Patent, is—

1. The combination of the draw-bar G, the hook O, and the clevis D, with the lifting rod or handle S attached thereto, substantially as described.

2. The draw-bar G, hook O, and clevis D, with handle S, in combination with the lever N, sliding in the eye of arm J, substantially as shown and described.

NEWTON J. GLOVER.

Witnesses:
HENRY E. RHOADS,
ROBERT J. GLOVER.